(12) United States Patent
Lew et al.

(10) Patent No.: US 10,924,739 B2
(45) Date of Patent: Feb. 16, 2021

(54) EFFICIENT QUANTIZATION PARAMETER PREDICTION METHOD FOR LOW LATENCY VIDEO CODING

(71) Applicant: ATI Technologies ULC, Markham (CA)

(72) Inventors: Dennis Lew, Toronto (CA); Jiao Wang, Maple (CA); Lei Zhang, Richmond Hill (CA); Edward A. Harold, Scarborough (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/177,156

(22) Filed: Oct. 31, 2018

(65) Prior Publication Data
US 2020/0137390 A1    Apr. 30, 2020

(51) Int. Cl.
| | |
|---|---|
| *H04N 7/12* | (2006.01) |
| *H04N 19/124* | (2014.01) |
| *H04N 19/159* | (2014.01) |
| *H04N 19/172* | (2014.01) |
| *H04N 19/176* | (2014.01) |

(52) U.S. Cl.
CPC ......... *H04N 19/124* (2014.11); *H04N 19/159* (2014.11); *H04N 19/172* (2014.11); *H04N 19/176* (2014.11)

(58) Field of Classification Search
CPC .. H04N 19/124; H04N 19/159; H04N 19/176; H04N 19/172
See application file for complete search history.

(56) References Cited

U.S. PATENT DOCUMENTS

| | | |
|---|---|---|
| 2004/0179596 A1 | 9/2004 | Song et al. |
| 2005/0047504 A1 | 3/2005 | Sung et al. |
| 2005/0123050 A1* | 6/2005 | Kondo .................. H04N 19/61 375/240.16 |

(Continued)

OTHER PUBLICATIONS

"Co-occurrence matrix", Wikipedia.org, Sep. 7, 2016, 2 pages, https://en.wikipedia.org/wiki/Co-occurrence_matrix. [Retrieved Jul. 31, 2018].

(Continued)

*Primary Examiner* — Howard D Brown, Jr.
(74) *Attorney, Agent, or Firm* — Kowert Hood Munyon Rankin and Goetzel PC; Rory D. Rankin (57) ABSTRACT

Systems, apparatuses, and methods for calculating a quantization parameter (QP) for encoding video frames to meet a given bit budget are disclosed. Control logic coupled to an encoder calculates a complexity indicator that represents a level of difficulty in encoding a previous video frame. The complexity indicator is based at least in part on a first parameter associated with the previous video frame and corresponds to one or more of a variance, an intra-prediction factor, and an inter-to-intra ratio. The complexity indicator is then used by the control logic to calculate a preferred QP to use to encode the current video frame to meet a given bit budget. By using the preferred QP generated based on the complexity indicator, the encoder is able to make fewer QP adjustments during the frame. This helps to improve the visual quality of the resulting encoded video bitstream.

20 Claims, 8 Drawing Sheets

(56) References Cited

U.S. PATENT DOCUMENTS

| | | |
|---|---|---|
| 2005/0175091 A1* | 8/2005 | Puri .................... H04N 19/115 375/240.03 |
| 2007/0071094 A1 | 3/2007 | Takeda et al. |
| 2012/0026394 A1* | 2/2012 | Maruyama ............. H04N 19/14 348/465 |
| 2014/0269919 A1 | 9/2014 | Rodriguez |
| 2014/0376624 A1 | 12/2014 | Li et al. |
| 2015/0055706 A1 | 2/2015 | Xu et al. |
| 2015/0237346 A1* | 8/2015 | Symes ................. H04N 19/124 375/240.03 |
| 2015/0256850 A1 | 9/2015 | Kottke et al. |
| 2016/0234496 A1 | 8/2016 | Panda et al. |
| 2016/0309149 A1* | 10/2016 | Thirumalai .......... H04N 19/129 |
| 2017/0359579 A1* | 12/2017 | Miyauchi ............. H04N 19/124 |
| 2018/0109804 A1 | 4/2018 | Saeedi |
| 2019/0045210 A1 | 2/2019 | Guermazi et al. |

OTHER PUBLICATIONS

International Search Report and Written Opinion in International Application No. PCT/IB2019/057945, dated Dec. 9, 2019, 8 pages.
International Search Report and Written Opinion in International Application No. PCT/IB2019/055357, dated Nov. 26, 2019, 9 pages.

\* cited by examiner

$$SIZE = \frac{complex}{2 \wedge \left(\frac{QP}{\alpha}\right)} \quad \leftarrow Equation\ 305$$

$$QP = \alpha \times \log_2\left(\frac{complex}{SIZE}\right) \quad \leftarrow Equation\ 310$$

FIG. 3

$$\text{intra\_pred\_factor}(i, QP_i) = \frac{\{\sum_b \text{intraBits}(b)\} \times 2^{QP_i/\alpha}}{\text{variance}(i)} \quad \text{Equation 405}$$

$$\text{inter\_intra\_ratio}(i, QP_i) = \frac{\sum_b \min(\text{interBits}(b), \text{intraBits}(b))}{\sum_b \text{intraBits}(b)} \quad \text{Equation 410}$$

$$\text{actual\_complexity} = \text{size}(i, QP_i) \times 2^{QP_i/\alpha} \quad \text{Equation 415}$$

$$\text{estimated\_complexity} = \text{variance}(i) * \text{intra\_pred\_factor}(i, QP_i) \quad \text{Equation 420}$$

$$\text{estimated\_complexity} = \text{variance}(i) * \text{intra\_pred\_factor}(i, QP_i) * \text{inter\_intra\_ratio}(i, QP_i) \quad \text{Equation 425}$$

$$\text{weight} = \text{size}(i, QP_i) / \text{SIZE} \quad \text{Equation 430}$$

$$\text{weight} = \text{SIZE} / \text{size}(i, QP_i) \quad \text{Equation 435}$$

$$\text{weight} = QP_i / QP_{preferred} \quad \text{Equation 440}$$

$$\text{weight} = QP_{preferred} / QP_i \quad \text{Equation 445}$$

$$\text{complex} = (\text{weight} * \text{actual\_complexity}) + ((1-\text{weight}) * \text{estimated\_complexity}) \quad \text{Equation 450}$$

EFFICIENT QUANTIZATION PARAMETER PREDICTION METHOD FOR LOW LATENCY VIDEO CODING

BACKGROUND

Description of the Related Art

Various applications perform encoding and decoding of images or video content. For example, video transcoding, desktop sharing, cloud gaming and gaming spectatorship are some of the applications which include support for encoding and decoding of content. One of the parameters that determines how content is encoded is the quantization parameter (QP). In various block-based video encoding schemes, such as those that comply with the H.264 standard, the QP regulates how much spatial detail is preserved during the encoding process. The QP selected for each video frame or each block of the frame is directly related to the size of the encoded video frame or size of the encoded block. Selecting lower QP values will retain more spatial detail while yielding larger encoded sizes. Selecting higher QP values will cause more spatial detail to be lost while producing smaller encoded sizes. It is noted that the term "quantization parameter" can also be referred to more generally as "quantization strength".

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for calculating a quantization parameter (QP) for encoding video frames to meet a given bit budget are disclosed herein. In one implementation, a system includes at least an encoder, control logic, and a memory coupled to the encoder and control logic. The control logic calculates a complexity indicator based on at least a first parameter associated with a previous video frame and/or a first encoding pass of a current video frame. Generally speaking, the complexity indicator represents a level of difficulty in encoding a given frame. In one implementation, the first parameter is the variance. In another implementation, the first parameter is an intra-prediction factor. In a further implementation, the first parameter is an inter-to-intra ratio. In other implementations, the first parameter includes multiple of these parameters and/or one or more other parameters. In some implementations, the control logic calculates the complexity indicator based on at least the first parameter associated with two or more previous video frames. The complexity indicator is then used by the control logic to calculate a preferred QP to use to encode the current video frame to meet a given bit budget. By using the preferred QP generated based on the complexity indicator, the encoder is able to make fewer QP adjustments during the frame. This helps to improve the visual quality of the resulting encoded video bitstream.

Figure 1:
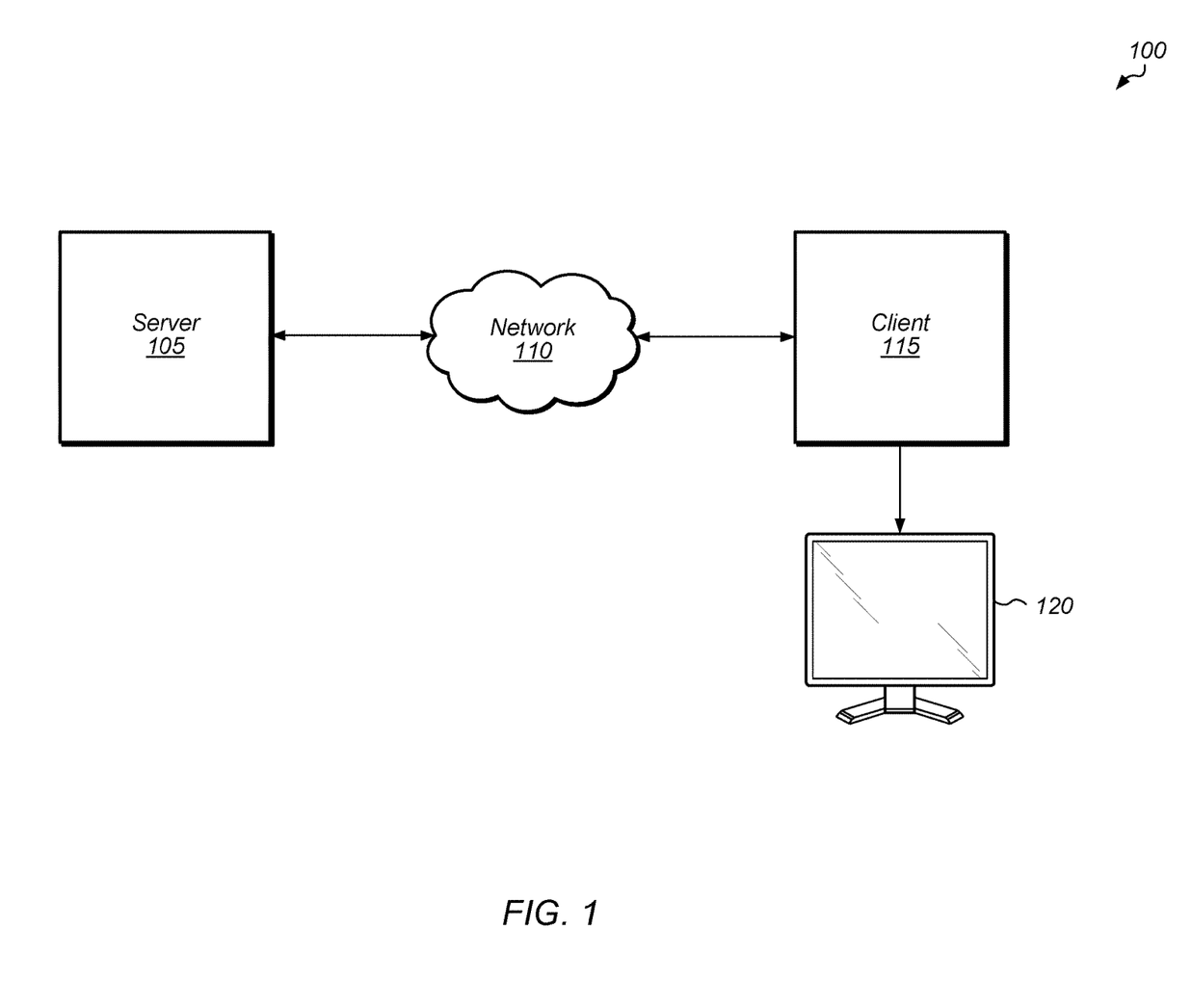
FIG. 1 is a block diagram of one implementation of a system for encoding and decoding content.

Referring now to FIG. 1, a block diagram of one implementation of a system 100 for encoding and decoding content is shown. System 100 includes server 105, network 110, client 115, and display 120. In other implementations, system 100 includes multiple clients connected to server 105 via network 110, with the multiple clients receiving the same bitstream or different bitstreams generated by server 105. System 100 can also include more than one server 105 for generating multiple bitstreams for multiple clients.

In one implementation, system 100 implements encoding and decoding of video content. In various implementations, different applications such as a video game application, a cloud gaming application, a virtual desktop infrastructure application, or a screen sharing application are implemented by system 100. In other implementations, system 100 executes other types of applications. In one implementation, server 105 renders video or image frames, encodes the rendered frames into a bitstream, and then conveys the encoded bitstream to client 115 via network 110. Client 115 decodes the encoded bitstream and generate video or image frames to drive to display 120 or to a display compositor.

Network 110 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 110 includes remote direct memory access (RDMA) hardware and/or software, transmission control protocol/internet protocol (TCP/IP) hardware and/or software, router, repeaters, switches, grids, and/or other components.

Server 105 includes any combination of software and/or hardware for rendering video/image frames and encoding the frames into a bitstream. In one implementation, server 105 includes one or more software applications executing on one or more processors of one or more servers. Server 105 also includes network communication capabilities, one or more input/output devices, and/or other components. The processor(s) of server 105 include any number and type (e.g., graphics processing units (GPUs), central processing units (CPUs), digital signal processors (DSPs), field programmable gate arrays (FPGAs), application specific integrated circuits (ASICs)) of processors. The processor(s) are coupled to one or more memory devices storing program instructions executable by the processor(s). Similarly, client 115 includes any combination of software and/or hardware for decoding a bitstream and driving frames to display 120. In one implementation, client 115 includes one or more software applications executing on one or more processors of one or more computing devices. In various implementations, client 115 is a computing device, game console, mobile device, streaming media player, or other type of device.

Figure 2:
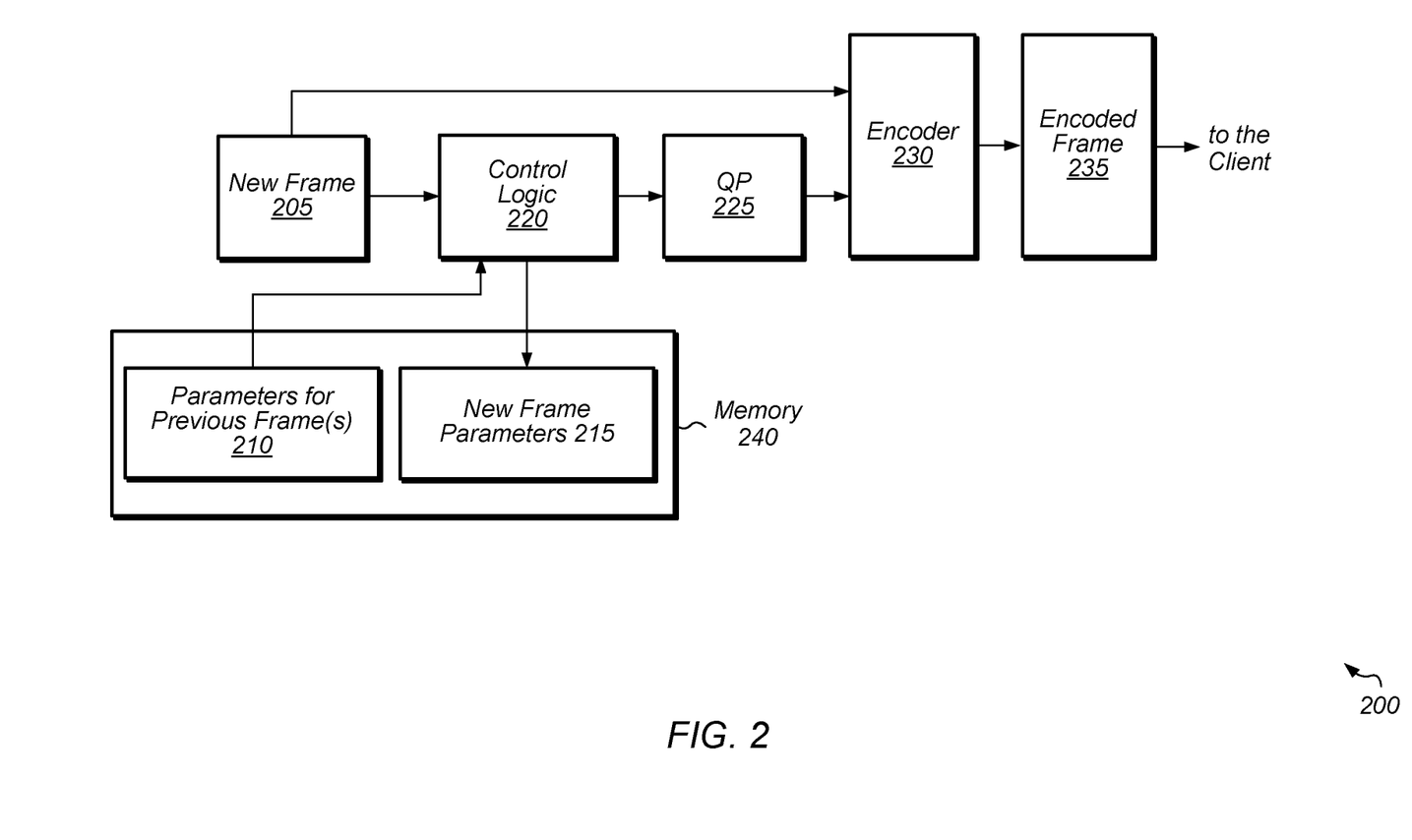
FIG. 2 is a block diagram of one implementation of the software components of a server for encoding frames of a video.

Turning now to FIG. 2, a block diagram of one implementation of the software components of a server 200 for encoding frames of a video is shown. It is noted that in other implementations, server 200 includes other components and/or is arranged in other suitable manners than is shown in FIG. 2. A new frame 205 of a video is received by server 200 and provided to control logic 220 and encoder 230. Each of control logic 220 and encoder 230 is implemented using any suitable combination of hardware and/or software. Control logic 220 generates quantization parameter (QP) 225 to be used by encoder 230 when encoding new frame 205. In one implementation, control logic 220 generates QP 225 based on parameters for previous frame(s) 210 and/or parameters from a first-pass encoding of new frame 205. In various implementations, these parameters include one or more of variance, intra prediction factor, inter-intra ratio, and/or one or more other parameters. In one implementation, control logic 220 generates new frame parameters 215 based on statistics generated during an analysis and/or first-pass encoding of new frame 205. Control logic 220 stores new frame parameters 215 in memory 240, and new frame parameters 215 are used for encoding a second-pass of new frame 205 and/or a subsequent frame of the video stream. Memory 240 is representative of any number and type of memory or cache device(s) for storing data and/or instructions associated with the encoding process.

Encoder 230 receives new frame 205 and encodes new frame 205 using a QP value equal to QP 225 generated by control logic 220. In one implementation, when encoder 230 starts encoding new frame 205, encoder sets the starting QP value to be equal to the QP 225 calculated by control logic 220. The output of encoder 230 is encoded frame 235 which is conveyed to one or more clients (e.g., client 115 of FIG. 1) and/or stored in memory. In one implementation, control logic 220 performs a first-pass encoding of new frame 205 and encoder 230 performs a second-pass encoding of new frame 205. In another implementation, encoder 230 performs a first-pass encoding and a second-pass encoding of new frame 205. In a further implementation, only a single-pass encoding of new frame 205 is performed by encoder 230.

In one implementation, control logic 220 generates a complexity indicator which is based on the parameters for previous frame(s) 210 and/or parameters from a first-pass encoding of new frame 205. The complexity indicator is then used to generate a starting QP value 225 for encoding new frame 205 based on a bit rate that has been selected for the resulting encoded bit stream. By selecting an appropriate starting QP value 225, encoder 230 will typically make fewer QP adjustments during encoding of new frame 205. This will help to improve the visual quality of the resulting encoded frame 235.

Figure 3:
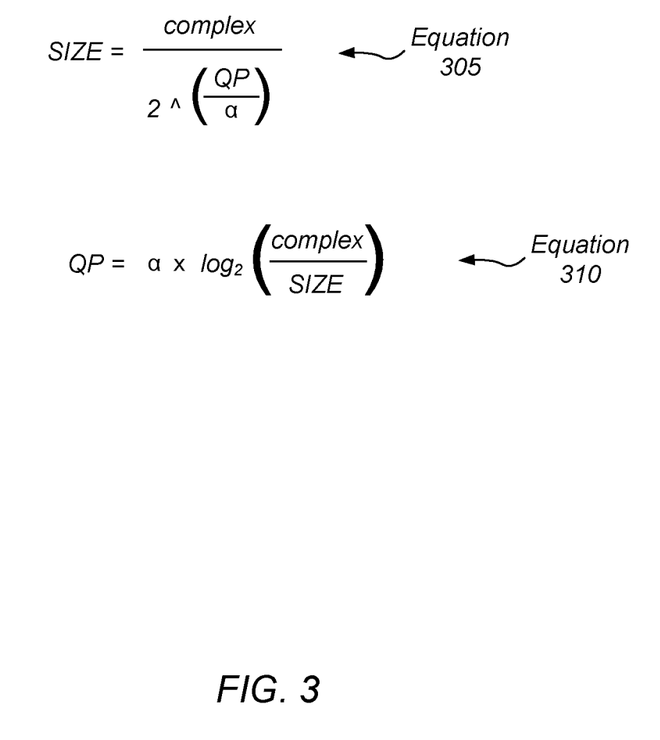
FIG. 3 illustrates equations for calculating the quantization parameter (QP) for encoding a video frame in accordance with one implementation.

Referring now to FIG. 3, equations for calculating the quantization parameter (QP) for encoding a video frame are shown. The size of a compressed frame is calculated according to the formula showed in equation 305. The bit size of the compressed frame is equal to a complexity indicator divided by the value of two to the power of QP divided by α. The complexity indicator is a value that represents how difficult it is for the encoder to compress the frame. The QP value has a range of 0 to 51 for the advanced video coding (AVC) and high efficiency video coding (HEVC) video compression standards. For the VP9 standard, the QP value has a range of 0 to 255. The a value is a constant value that is experimentally derived for a particular encoder. The equation 310 is generated by solving equation 305 for QP.

In one implementation, to derive the complexity indicator for a given frame, the following parameters will be determined. First, the variance of the frame i, or variance(i) is determined. Also, a value that represents how effective the intra prediction is for the frame i at $QP_i$, or intra_pred_factor (i, $QP_i$) is determined. It is noted that "intra_pred_factor(i, $QP_i$)" is also referred to herein as the "intra-prediction factor". Additionally, a ratio of inter bits to intra bits for frame i at $QP_i$, or inter_intra_ratio(i, $QP_i$) is determined. It is noted that "inter_intra_ratio(i, $QP_i$)" is also referred to herein as the "inter-to-intra ratio". For these parameters, in one implementation, "i" is the number of the previous encoded frame. In another implementation, "i" is the number of the first pass of the frame currently being encoded. Similarly, in one implementation, "$QP_i$" is the QP value used for the previous encoded frame while in another implementation, "$QP_i$" is the QP value used for the first pass of the frame currently being encoded. In a single pass encoder, the three parameters (variance(i), intra_pred_factor(i, $QP_i$), inter_intra_ratio(i, $QP_i$)) would be accumulated from the previously encoded frame. In a two-pass encoder, these three parameters would be accumulated in the first pass.

In one implementation, one of the components of the "complex" value is a measure of the information contained in the frame. In one implementation, a value used to measure the information contained in the frame is the activity. In one implementation, the activity is calculated by adding together the sum of absolute differences between neighboring pixels. In another implementation, the variance is used to measure the information contained in the frame. In this implementation, the variance of a frame is determined by the following equation: variance(i)=$\Sigma_b$ block_variance(b). In this equation, "b" is the block number in the frame, with the size of block being 16×16 pixels, 32×32 pixels, 64×64 pixels, or some other size. Also, in this equation, block_variance(b) is the variance of pixel values in block "b".

Figure 4:
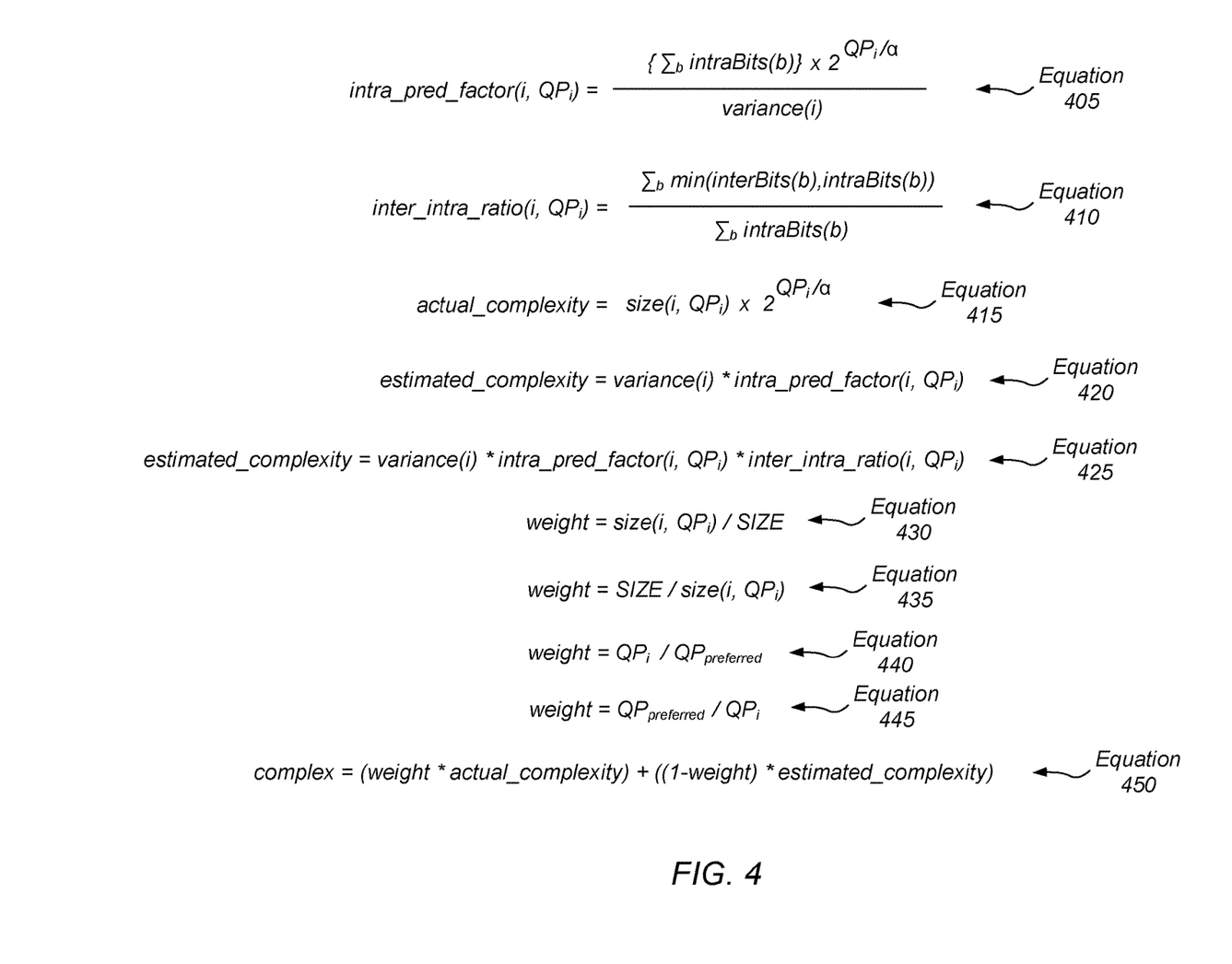
FIG. 4 illustrates equations for calculating parameters associated with the encoding of a frame in accordance with one implementation.

Turning now to FIG. 4, equations for calculating parameters associated with the encoding of a frame are shown. The intra_pred_factor(i, $QP_i$) value represents how effective the intra prediction is for a frame. As used herein, "intra prediction" refers to predicting pixel values within a given frame based on other pixel values within the same given frame. While encoding a frame, the encoder supplies the number of bits needed to encode an intra block (at $QP_i$). This value will be known as intraBits(b), and intraBits(b) is one of the statistics used in the encoder's rate-distortion optimization (RDO) process. In one implementation, intra_pred_factor(i, $QP_i$) is derived using equation 405.

For inter frames, the inter_intra_ratio(i, $QP_i$) value is the ratio of inter bits needed to intra bits needed (at $QP_i$). As used herein, the term "inter bits" refers to the number of bits needed to encode a frame using only inter frame encoding. The term "inter frame encoding" is defined as encoding a frame using information from one or more other frames before and/or after the frame and without using information from other pixels within the frame. Also, the term "intra bits" refers to the number of bits needed to encode a frame using only intra frame encoding (i.e., intra prediction). The interBits(b) value is supplied by the encoder in the same manner as the intraBits(b) value. In one implementation, the inter_intra_ratio(i, $QP_i$) value is derived from equation 410.

Once a given frame has finished encoding, the following parameters will be available for frame i: variance(i), intra_pred_factor(i, $QP_i$), inter_intra_ratio(i, $QP_i$), and size (i, $QP_i$). The size(i, $QP_i$) parameter refers to the size of the encoded frame i in bits. In one implementation, an actual frame complexity value ("actual_complexity") is derived using equation 415. In one implementation, an estimated complexity ("estimated_complexity") value for intra frames is derived using equation 420: estimated_complexity=variance(i)*intra_pred_factor(i, $QP_i$). In one implementation, an estimated complexity value for inter frames is derived using equation 425: estimated_complexity=variance(i)*intra_pred_factor(i, $QP_i$)*inter_intra_ratio(i, $QP_i$).

In one implementation, if the preferred size (or SIZE) of the compressed frame is known, then if size(i, $QP_i$)<SIZE, a weighting factor is calculated using the following formula shown in equation 430: weight=size(i, $QP_i$)/SIZE. Otherwise, if size(i, $QP_i$)≥SIZE, the weighting factor is calculated using the following formula shown in equation 435: weight=SIZE/size(i, $QP_i$). In one implementation, if the preferred QP (or $QP_{preferred}$) is known, then if $QP_i$<$QP_{preferred}$, the weighting factor is calculated using the following formula shown in equation 440: weight=$QP_i$/$QP_{preferred}$. Otherwise, if $QP_i$≥$QP_{preferred}$, then the weighting factor is calculated using the following formula shown in equation 445: weight=$QP_{preferred}$/$QP_i$. In one implementation, the complexity indicator is calculated using the following formula shown in equation 450: complex=(weight*actual_complexity)+((1−weight)*estimated_complexity). Once the complexity indicator is calculated, the SIZE or QP values are derived using equations 305 or 310, respectively.

Figure 5:
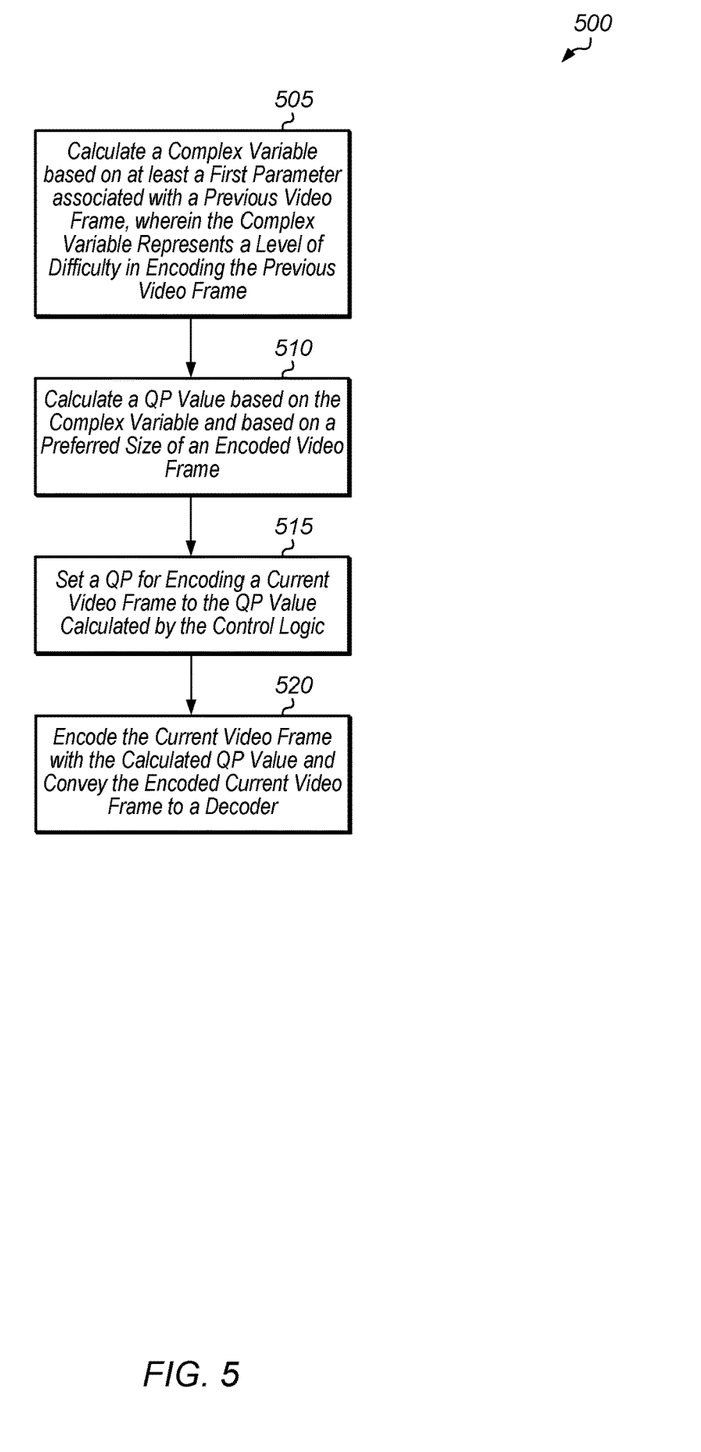
FIG. 5 is a generalized flow diagram illustrating one implementation of a method for determining a quantization parameter (QP) to use when encoding a video frame.
Figure 6:
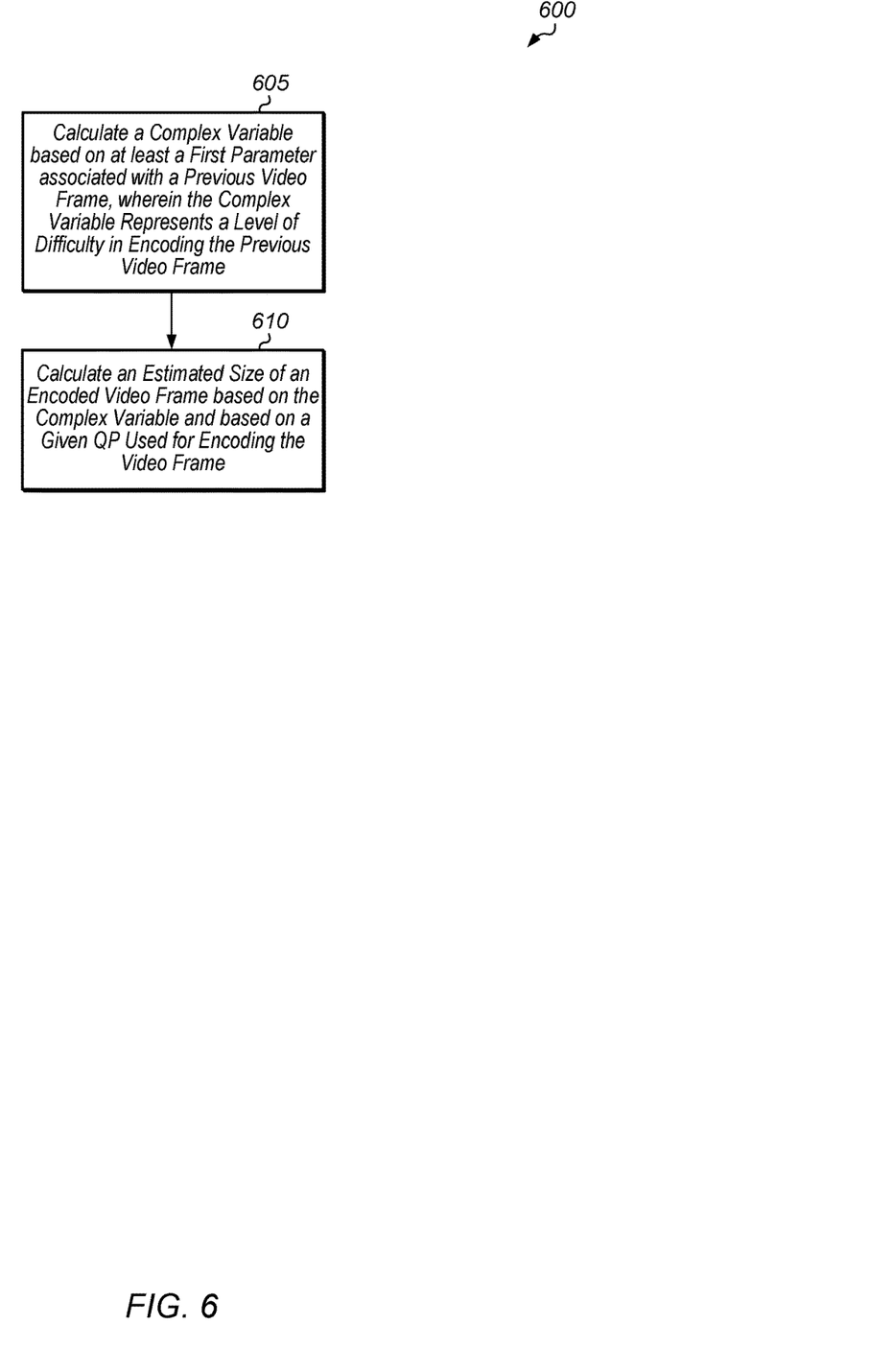
FIG. 6 is a generalized flow diagram illustrating another implementation of a method for calculating an estimated size of an encoded frame based on a complexity indicator.
Figure 7:
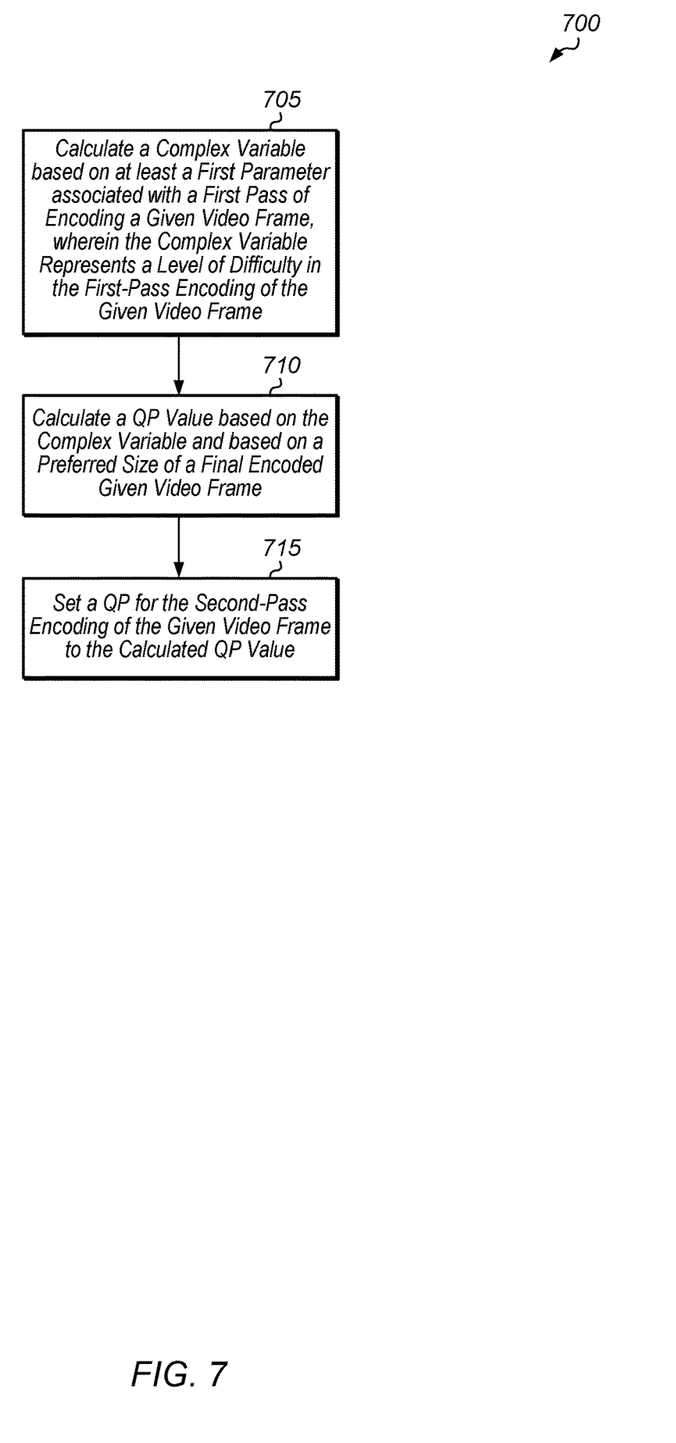
FIG. 7 is a generalized flow diagram illustrating one implementation of a method for determining a QP to use when encoding a video frame.
Figure 8:
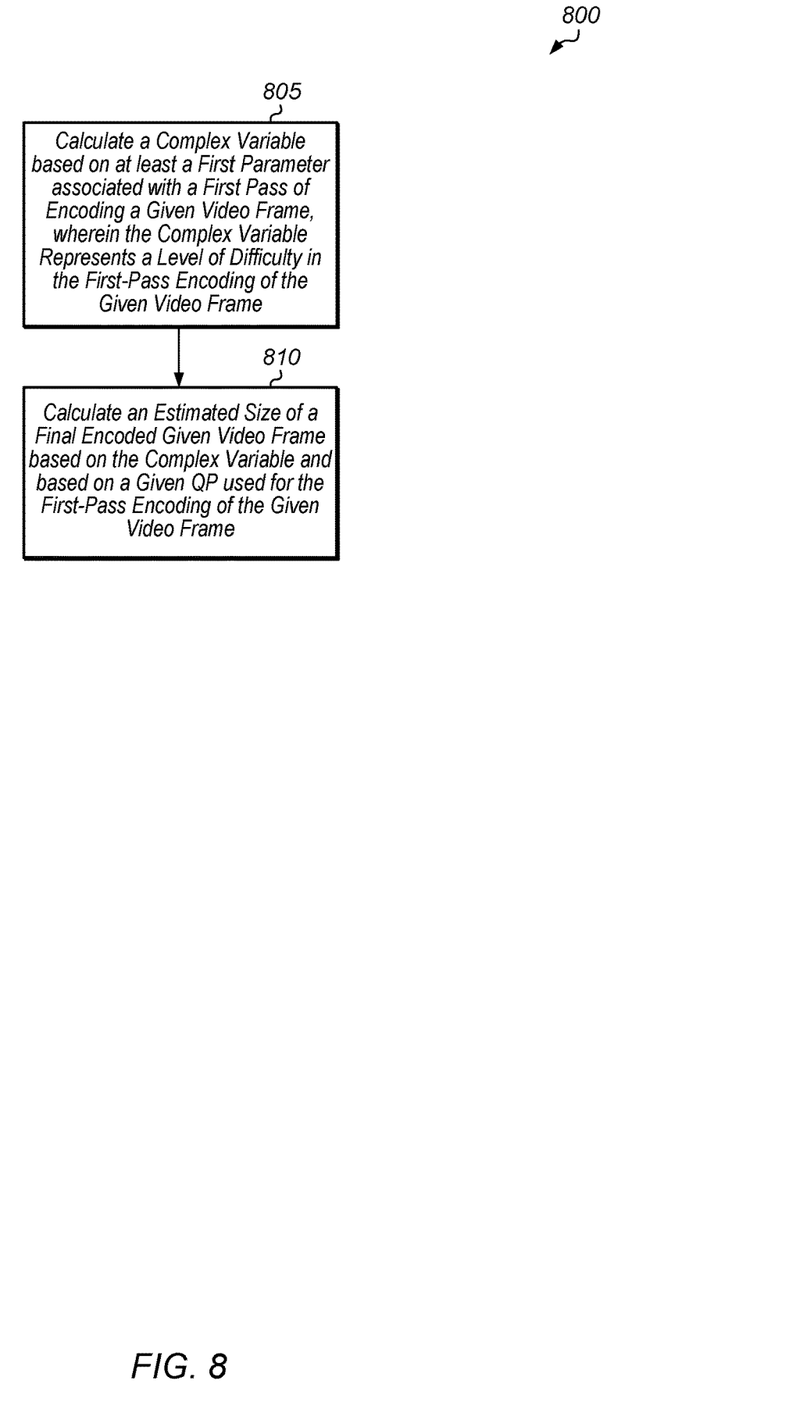
FIG. 8 is a generalized flow diagram illustrating one implementation of a method for calculating an estimated size of an encoded frame based on a complexity indicator.

Referring now to FIG. 5, one implementation of a method 500 for determining a quantization parameter (QP) to use when encoding a video frame is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

Control logic connected to an encoder calculates a complexity indicator based on at least a first parameter associated with a previous video frame. As previously noted, the complexity indicator represents a level of difficulty in encoding the previous video frame (block 505). In one implementation, the first parameter is the variance. In another implementation, the first parameter is an intra-prediction factor. In a further implementation, the first parameter is an inter-to-intra ratio. In other implementations, the first parameter includes multiple of these parameters and/or one or more other parameters. In some implementations, the control logic calculates the complexity indicator based on at least the first parameter associated with two or more previous video frames.

Next, the control logic calculates a quantization parameter (QP) value based on the complexity indicator and based on a preferred size of an encoded video frame (block 510). In one implementation, the QP value is calculated using equation 310 (of FIG. 3). In one implementation, the preferred size of the encoded video frame is determined based on a preferred bit rate for transmitting an encoded video stream. For example, in one implementation, the preferred bit rate is specified in bits per second (e.g., 3 megabits per second (Mbps)) and the frame rate of the video sequence is specified in frames per second (fps) (e.g., 60 fps, 24 fps). In this implementation, the control logic divides the preferred bit rate by the frame rate to calculate a preferred size of the encoded video frame. Then, the encoder sets a QP for encoding a current video frame to the QP value calculated by the control logic (block 515). Next, the encoder encodes the current video frame with the calculated QP value and conveys the encoded current video frame to a decoder (block 520). After block 520, method 500 ends.

Turning now to FIG. 6, one implementation of a method 600 for calculating an estimated size of an encoded frame based on a complexity indicator is shown. Control logic connected to or integrated within an encoder calculates a complexity indicator based on at least a first parameter associated with a previous video frame, where the complexity indicator represents a level of difficulty in encoding the previous video frame (block 605). Next, the control logic calculates an estimated size of an encoded video frame based on the complexity indicator and based on a given QP used for encoding the video frame (block 610). After block 610, method 600 ends.

Referring now to FIG. 7, one implementation of a method 700 for determining a QP to use when encoding a video frame is shown. Control logic associated with an encoder calculates a complexity indicator based on at least a first parameter associated with a first pass of encoding a given video frame, where the complexity indicator represents a level of difficulty in the first-pass encoding of the given video frame (block 705). Next, the control logic calculates a quantization parameter (QP) value based on the complexity indicator and based on a preferred size of a final encoded given video frame (block 710). The final encoded given video frame refers to the output of the second-pass encoding of the given video frame. Then, the encoder sets a QP for the second-pass encoding of the given video frame to the QP value calculated by the control logic (block 715). After block 715, method 700 ends.

Turning now to FIG. 8, one implementation of a method 800 for calculating an estimated size of an encoded frame based on a complexity indicator is shown. Control logic coupled to an encoder calculates a complexity indicator based on at least a first parameter associated with a first pass of encoding a given video frame, where the complexity indicator represents a level of difficulty in the first-pass encoding of the given video frame (block 805). Next, the control logic calculates an estimated size of a final encoded given video frame based on the complexity indicator and based on a given QP used for the first-pass encoding of the given video frame (block 810). After block 810, method 800 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HIDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
an encoder configured to encode video frames of a video stream;
control logic coupled to the encoder, wherein the control logic is configured to:
calculate a complexity indicator that represents a level of difficulty in encoding a previous video frame, wherein the complexity indicator is calculated based at least in part on a calculated actual complexity of the previous video frame and a calculated estimated complexity of the previous video frame; and
calculate a quantization parameter (QP) value based on the complexity indicator and a preferred size of an encoded video frame;
wherein the encoder is configured to:
generate an encoded video frame that represents a current video frame by setting a QP to the QP value calculated by the control logic; and
convey the encoded video frame to a decoder to be displayed.

2. The system as recited in claim 1, wherein the estimated complexity is based at least in part on a first parameter associated with the previous video frame and corresponds to one or more of a variance, an intra-prediction factor, and an inter-to-intra ratio.

3. The system as recited in claim 2, wherein the intra-prediction factor represents how effective intra prediction was for the previous video frame at a given QP.

4. The system as recited in claim 2, wherein the inter-to-intra ratio represents a ratio of inter-coded bits to intra-coded bits for the previous video frame at a given QP.

5. The system as recited in claim 1, wherein the actual complexity is based at least in part on a quantization parameter of the previous video frame, and the estimate complexity is based at least in part on a calculated variance of the previous video frame.

6. The system as recited in claim 5, wherein the variance is calculated based on a sum of block variances in the previous video frame.

7. The system as recited in claim 1, wherein the control logic is further configured to generate one or more parameters based on the current video frame for use in generating a next complexity indicator for encoding a next video frame.

8. A method comprising:
calculating, by control logic, a complexity indicator based on a level of difficulty in encoding a previous video frame, wherein the complexity indicator is calculated based at least in part on a calculated actual complexity of the previous video frame and a calculated estimated complexity of the previous video frame;
calculating, by the control logic, a quantization parameter (QP) value based on the complexity indicator and a preferred size of an encoded video frame;
generating, by an encoder, an encoded video frame that represents a current video frame by setting a QP to the QP value calculated by the control logic; and
conveying, by the encoder, the encoded video frame to a decoder to be displayed.

9. The method as recited in claim 8, wherein the estimated complexity is based at least in part on a first parameter associated with the previous video frame and corresponds to one or more of a variance, an intra-prediction factor, and an inter-to-intra ratio.

10. The method as recited in claim 9, wherein the intra-prediction factor represents how effective intra prediction was for the previous video frame at a given QP.

11. The method as recited in claim 9, wherein the inter-to-intra ratio represents a ratio of inter-coded bits to intra-coded bits for the previous video frame at a given QP.

12. The method as recited in claim 8, further comprising:
calculating the actual complexity based at least in part on a quantization parameter of the previous video frame; and
calculating the estimate complexity based at least in part on a calculated variance of the previous video frame.

13. The method as recited in claim 12, further comprising calculating the variance based on a sum of block variances in the previous video frame.

14. The method as recited in claim 8, further comprising generating one or more parameters based on the current video frame for use in generating a next complexity indicator for encoding a next video frame.

15. An apparatus comprising:
a memory;
an encoder coupled to the memory; and
control logic coupled to the encoder, wherein the control logic is configured to:
calculate a complexity indicator based on a level of difficulty in encoding a previous video frame, wherein the complexity indicator is calculated based at least in part on a calculated actual complexity of the previous video frame and a calculated estimated complexity of the previous video frame; and
calculate a quantization parameter (QP) value based on the complexity indicator and based on a preferred size of an encoded video frame;
wherein the encoder is configured to:
generate an encoded video frame that represents a current video frame by setting a QP to the QP value calculated by the control logic; and
convey the encoded video frame to a decoder to be displayed.

16. The apparatus as recited in claim 15, wherein the estimated complexity is based at least in part on a first parameter associated with the previous video frame and corresponds to one or more of a variance, an intra-prediction factor, and an inter-to-intra ratio.

17. The apparatus as recited in claim 16, wherein the intra-prediction factor represents how effective intra prediction was for the previous video frame at a given QP.

18. The apparatus as recited in claim 16, wherein the inter-to-intra ratio represents a ratio of inter-coded bits to intra-coded bits for the previous video frame at a given QP.

19. The apparatus as recited in claim 15, wherein the actual complexity is based at least in part on a quantization parameter of the previous video frame, and the estimate complexity is based at least in part on a calculated variance of the previous video frame.

20. The apparatus as recited in claim 19, wherein the variance is calculated based on a sum of block variances in the previous video frame.

* * * * *